G. K. HURLBUT.
SNAP HOOK.
APPLICATION FILED FEB. 10, 1916.
1,231,742.
Patented July 3, 1917.
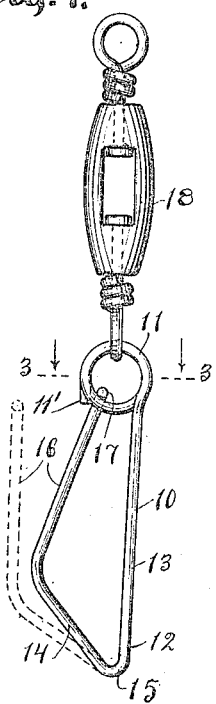
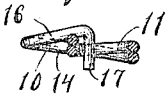
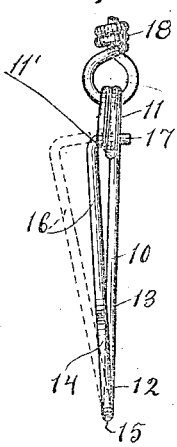
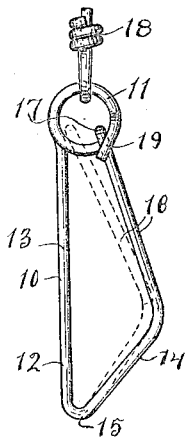
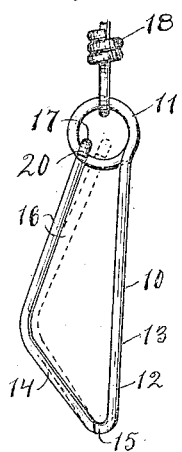
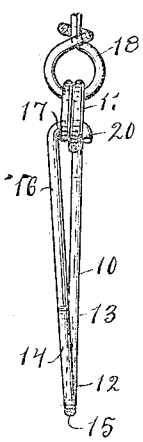
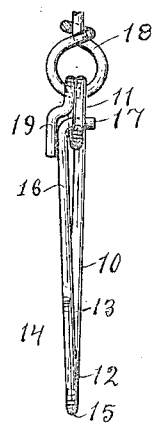
INVENTOR
George K. Hurlbut
Ursell, Keeney & French
ATTORNEYS

UNITED STATES PATENT OFFICE.

GEORGE K. HURLBUT, OF MILWAUKEE, WISCONSIN.

SNAP-HOOK.

1,231,742.

Specification of Letters Patent.

Patented July 3, 1917.

Application filed February 10, 1916. Serial No. 77,376.

*To all whom it may concern:*

Be it known that I, GEORGE K. HURLBUT, a citizen of the United States, and resident of Milwaukee, in the county of Milwaukee and State of Wisconsin, have invented new and useful Improvements in Snap-Hooks, of which the following is a description, reference being had to the accompanying drawings, which are a part of this specification.

This invention relates to improvements in snap hooks.

It is one of the objects of the present invention to provide a snap hook which is more particularly adapted for removably attaching fish-hooks, spinners, wooden minnows, etc. to the end of a fish line in a manner to permit the easy exchange of baits or the removal or attachment of fish hooks without the necessity of tying and untying knots in the line.

A further object of the invention is to provide a snap hook constructed from a single piece of spring wire bent to form a hook portion and a locking eye portion engaged by the hook portion in such a manner as to firmly hold a hook or other device from accidental disengagement therewith.

A further object of the invention is to provide a snap hook in which the free end portion of the hook is relieved to a considerable extent from the direct strain of the load or pull of the fish.

A further object of the invention is to provide a snap hook which is of simple construction, is strong and durable and is well adapted for the purpose described.

With the above and other objects in view the invention consists of the improved snap hook and its parts and combinations as set forth in the claims, and all equivalents thereof.

In the accompanying drawing in which the same reference characters indicate the same parts in all of the views:

Figure 1 is a side view of the improved snap hook shown in closed position, the free end of the hook being indicated in open position by dotted lines;

Fig. 2 is an edge view of the hook, a portion of the swivel being omitted, the view also indicating by dotted lines the free end portion of the hook being sprung to one side in order to open the same;

Fig. 3 is a transverse sectional view taken on line 3—3 of Fig. 1;

Fig. 4 is a side view of a slightly modified form of hook and a portion of the swivel, the view also indicating by dotted lines the free end of the hook swing inwardly to a position to permit the opening of the hook;

Fig. 5 is an edge view thereof;

Fig. 6 is a side view of another modified form of hook; and

Fig. 7 is an edge view thereof.

Referring to the drawing the numeral 10 indicates a piece of spring wire having one end bent spirally one turn and a half to form an eye 11 and the other end bent to form a hook 12 which depends from the eyed portion 11. The shank portion 13 of the hook extends downwardly from the eye in a straight line and the free end portion 14 forming the hook is bent upwardly outwardly with a short bend 15 and is then bent upwardly inwardly to form the tongue 16. The upper end portion of the tongue 16 is bent at right angles laterally in a direction toward the eye 11 to form the locking portion 17 of the tongue so that when extended into the eye it will remain in closed position. In order to maintain the tongue in closed position the hook portion of the wire is bent laterally in a direction toward the eye and forwardly in front of the edge of the eye so that to open the hook it will be necessary to spring the tongue laterally until the locking portion 17 disengages the eye and the tongue will then swing to open position as indicated by dotted lines in Fig. 1.

It will be noted that the end portion 11' of the wire forming the eye 11 is turned downwardly toward the shank and forms a stop guard to limit the outward movement of the locking portion 17 and to serve as a guard for the locking portion 17.

By forming the shank 13 approximately in a straight line with the hook portion 14 bent upwardly therefrom with a sharp bend, the strain of the pull is borne almost entirely by the shank portion thus relieving the hook portion from undue strain and preventing the hook from being accidentally pulled open.

The snap hooks are preferably attached to one of the eyed portions of a swivel member 18 to prevent the twisting of the line to which the snap hook is connected. By means of the spirally formed eye 11 the eye of the swivel may be easily turned into the eye of the hook in the same manner as attaching a key to a key ring. While a swivel member is shown as connected to the hook it is to be understood that the swivel is not necessary to the operation of the hook.

In the modified form shown in Figs. 4 and 5 the end of the wire forming the eye 11 is bent outwardly laterally and then downwardly to form a guard 19 beneath which the locking portion 17 of the tongue extends to form a more secure locking connection between the tongue and the eye.

In the modified form shown in Figs. 6 and 7 a guard for the same purpose is formed by bending the end of the locking portion 17 downwardly as indicated by the numeral 20. This downwardly bent guard prevents the hook portion from being released until the tongue it first bent inwardly as indicated by dotted lines in Fig. 6.

From the foregoing description it will be seen that the snap hook is of very simple construction and is well adapted for the purpose described.

What I claim as my invention is:

1. A fish hook attaching device, consisting of a piece of spring wire extending in a straight line medially of its length to form a shank portion having a spirally formed eye at the side of one end portion of the shank and with the wire end turned toward the shank, the opposite end portion of the wire extending at a short bend outwardly from the shank portion and toward the eye and with the free end portion extending laterally at an angle to the hook portion and entering the eye and engaging the inner side portion thereof, said short bend of the hook portion providing substantially a straight line pull on the shank portion.

2. A fish hook attaching device, consisting of a piece of spring wire extending in a straight line medially of its length to form a shank portion having a spirally formed eye at the side of one end portion of the shank and with the wire end turned toward the shank, the opposite end portion of the wire extending outwardly from the shank portion and toward the eye and with the free end portion extending laterally at an angle to the hook portion and entering the eye and engaging the inner side portion thereof and lockingly engaging the end portion of the wire forming the eye.

In testimony whereof, I affix my signature.

GEORGE K. HURLBUT.

Copies of this patent may be obtained for five cents each, by addressing the "Commissioner of Patents, Washington, D. C."